E. H. JANES.
WHEEL.
APPLICATION FILED MAR. 11, 1916.

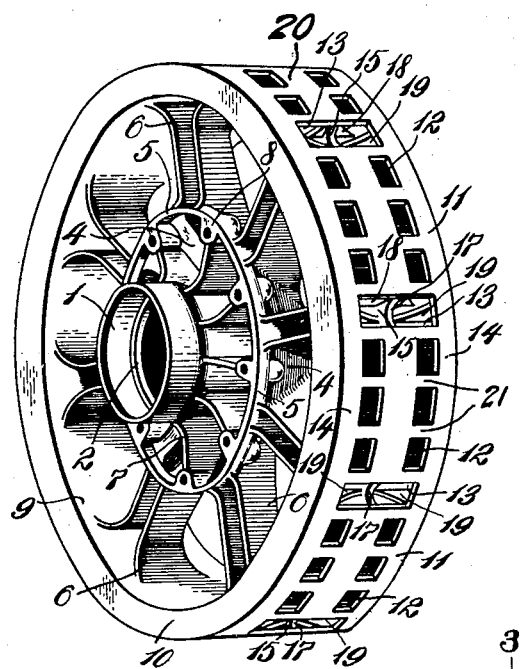

1,309,094.

Patented July 8, 1919.
2 SHEETS—SHEET 2.

Inventor
Edwin H. Janes
By Hull, Smith, Buck & West
Attys.

UNITED STATES PATENT OFFICE.

EDWIN H. JANES, OF CLEVELAND HEIGHTS, OHIO.

WHEEL.

1,309,094. Specification of Letters Patent. Patented July 8, 1919.

Application filed March 11, 1916. Serial No. 83,468.

*To all whom it may concern:*

Be it known that I, EDWIN H. JANES, a citizen of the United States, residing at Cleveland Heights, in the county of Cuyahoga and State of Ohio, have invented a certain new and useful Improvement in Wheels, of which the following is a full, clear, and exact description, reference being had to the accompanying drawings.

Figure 4:
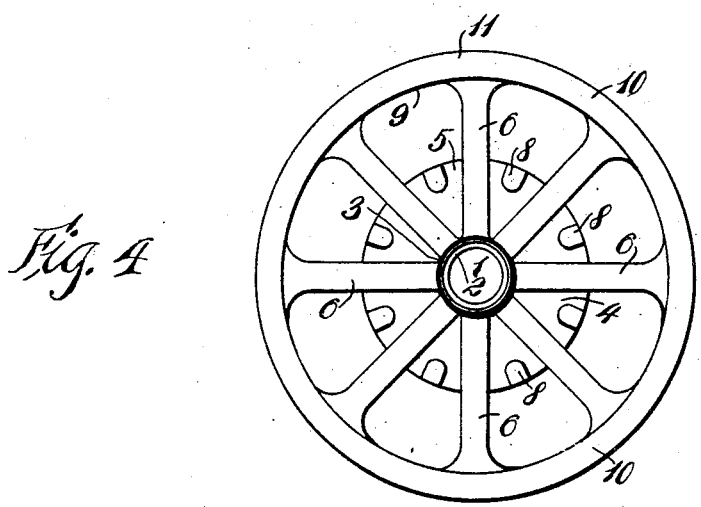
Figure 5:
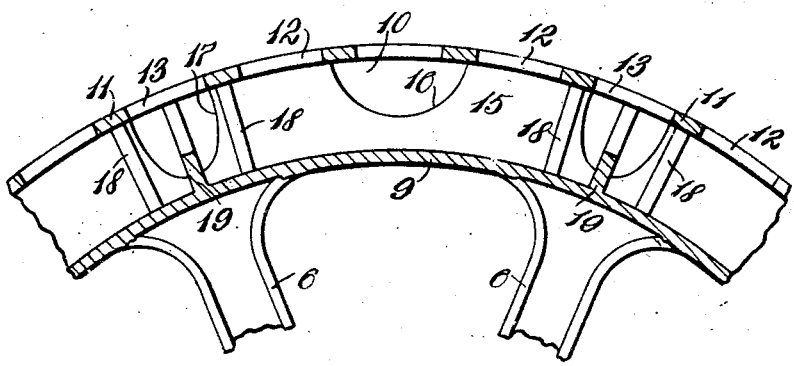
Figure 6:
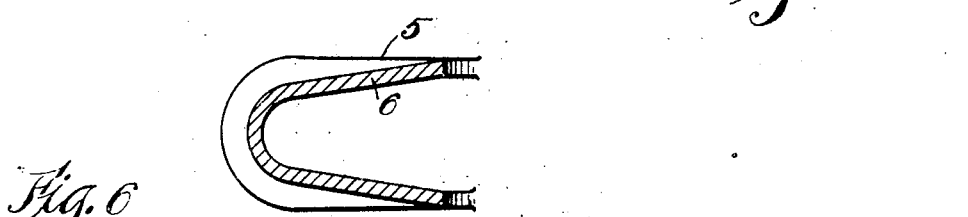

This invention relates to cast metal wheels which, while capable of employment with various types of tires—secured in place either by bolting or by being pressed on—is especially well adapted for use with dual tires. The invention also contemplates the production of a wheel in a single casting which has certain novel characteristics whereby its efficiency is enhanced and its production as an intact casting may be accomplished, without resultant shrinkage cracks. Further and more generally stated, the invention may be defined as consisting of the combinations of parts embodied in the claims hereto annexed and illustrated in the drawings accompanying and forming part hereof, wherein Figure 1 represents a perspective view of such wheel; Fig. 2 an elevation of the wheel taken from the inner side thereof; Fig. 3 a vertical sectional view taken through half of the wheel; Fig. 4 an elevation of the wheel taken from the outer side thereof; Fig. 5 a sectional view corresponding to the line 5—5 of Fig. 3 and looking in the direction of the arrows; and Fig. 6 a sectional detail through one of the spokes corresponding to the line 6—6 of Fig. 3 and looking in the direction of the arrows.

As previously stated, the wheel forming the subject matter of this application is primarily designed as a cast metal wheel wherein the hub, spokes, and felly are made as a single casting which is afterward properly machined for the purpose of finishing and adapting the same to coöperate with other parts, such as the disk which forms an inner face of the hub flange and the rims on which the tires are seated.

The wheel disclosed specifically herein comprises a hub having a tapered or frusto conical hub flange projecting therefrom, spokes extending from the said hub flange, and a double-walled felly the opposed walls whereof are united by ribs or struts the outer rim-supporting wall being a sectional wall, the solid portions whereof serve to support the tire bases in an efficient manner and with the employment of a minimum amount of metal.

Describing by reference characters the various parts illustrated herein, 1 denotes the hub proper of the wheel, which hub has a cylindrical interior, preferably with a pair of short annular flanges 2 therewithin. At its outer end the hub is shown as threaded—see 3—whereby it is adapted to receive a hub cap, if desired. 4 denotes a tapered, substantially frusto-conical flange, which extends radially outwardly from the hub proper and toward the inner (or body-facing) side of the wheel and having its peripheral flanged portion 5 machined to fit and center the brake drum. Cast with this flange are the spokes 6, said spokes being substantially U-shaped in cross section and having their flanges presented toward the inner side or face of the wheel, the flanges of the spokes merging with the hub flange 4. Radial ribs 7, which are preferably staggered with respect to the spokes 6, are formed with the hub flange 5 and serve to connect the interior surface thereof with the hub proper 1, and each of these ribs has formed therewith an interiorly threaded boss 8 which is adapted to receive a correspondingly threaded bolt or other means for assisting to secure thereto a disk, such as one of the end walls of a brake drum.

At their outer ends the spokes 6 merge with and abut against the inner cylindrical wall 9 of the felly. This felly comprises not only the wall 9 but radially extending side walls 10 and a cylindrical outer wall, indicated generally at 11, said cylindrical outer wall being lightened by providing a series of openings 12 between the central portion of the wall and the sides thereof. This wall is further lightened and cracks due to shrinkage prevented by casting the central portion thereof as a plurality of segments which are spaced by the openings 13 located preferably in line with the spoke ends and extending nearly across the outer wall, their lateral ends being preferably flush with the outer lateral ends of the apertures 12. This results in providing an outer tire carrying surface which consists of a pair of continuous opposed lateral flanges 14 which are united between the spoke ends by the metal straps comprised between the apertures 13. The central part of the segmental outer wall is connected to the inner wall by means of a rib 15 which is cast with the inner and outer walls. This rib is preferably notched at equally spaced intervals, as indicated at 16 and 17, the notches 16 being located between the spokes while the notches 17 are located opposite the outer ends of the spokes. Transverse strengthening ribs or struts 18 extend from opposite sides of the outer periphery of the rib 15 toward the walls 10, being cast with the rib 15 and the wall 9, the ends of the ribs 18 being spaced from the walls 10. Strengthening ribs or struts 19 are also cast with the walls 10 and 14 and the inner wall 9 and extend inwardly toward the rib 15. These last ribs extend across the apertures 13 opposite the ends of the spokes and they, as well as the ribs 15 and 18, are cast integral and intact with the other parts of the wheel. The ribs 18 and 19 are equally spaced at the ends of the central segments of the outer felly wall and bridge across from the ends of the spokes to the outer felly wall.

The flanges 14 and the central portion 20 of the outer cylindrical wall constitute a tire support. The central tire supporting portion 20 is connected to the flanges 14 by braces or pillars 21 which transmit pressure from the side walls to the central rib 15 and prevent the collapse of the side walls in cases where great frictional resistance is encountered in pressing a tire base upon the outer wall.

The cylindrical hub proper, the hub flange 5, the spokes 6, and the various parts of the felly are preferably made of the same thickness of metal. It has been found that, by so doing, the best results are obtained in casting the wheel, the parts being thereby prevented from cracking through the cooling of the casting. It has also been found that the notching of the central rib 15 results in preventing the cracking of said rib during the cooling operation after pouring the metal.

After the casting operation, the ends of the hub, the flanges 2 and the inner face of the hub flange 5 with its associated parts will be machined; also the outer wall of the felly and the outer surfaces of the ribs 18 and 19. The outer felly wall is adapted to receive the channel bases of pressed-on tires or the wedges used with demountable tires and, because of the structural features described herein, the wheel can be produced conveniently and economically from a single casting and without the production of cracks due to shrinkage.

The braces or pillars which connect the flanges 14 and the central tire supporting portion 20 are claimed in my copending application No. 141,697, filed January 10, 1917.

Having thus described my invention, what I claim is:—

1. A cast metal wheel comprising a hub and a felly connected thereto, said felly comprising an inner cylindrical wall, side walls extending from such inner wall, a cylindrical outer wall connecting the side walls, the outer wall having a segmental central portion and a rib connecting the inner wall and the central segmental portion of the outer wall.

2. A cast metal wheel comprising a hub and a felly connected thereto, said felly comprising an inner cylindrical wall, lateral walls projecting from opposite sides of such inner wall, and an outer cylindrical wall connected to the side walls, and a rib extending between the inner and outer wall and supporting the central portion of the outer wall, the central portion of the outer wall and the rib being recessed.

3. A cast metal wheel comprising a hub, spokes, and a felly supported by said spokes, said felly having an outwardly projecting rib which is notched or recessed in line with the spokes, and braces for said rib located at the ends of the spokes and supported thereby.

4. A cast metal wheel comprising a hub, spokes, and a felly connected to said spokes, the felly comprising an inner and an outer wall, the outer wall being adapted to form a supporting surface for tires, a central rib extending circumferentially between and connecting the inner and outer walls of said felly, and series of struts or ribs connecting said rib with the felly body.

5. A cast metal wheel comprising a hub, spokes, and a felly supported by said spokes, said felly comprising an inner cylindrical wall, flanges projecting from opposite sides of said wall and an outer cylindrical wall connected to said flanges, the outer wall comprising a series of circumferentially spaced segmental supporting surfaces located between the flanges, the surfaces being spaced apart by apertures and there being a series of apertures between each flange and the central portion of each segment, a segmental rib connecting the inner wall of the felly with the segmental supporting portions, and transversely extending struts or ribs connected to the last mentioned rib and to the inner wall of the felly.

In testimony whereof, I hereunto affix my signature in the presence of two witnesses.

EDWIN H. JANES.

Witnesses.
 R. L. BRUCK,
 H. K. BELL.